United States Patent
Song et al.

(10) Patent No.: US 12,510,062 B2
(45) Date of Patent: Dec. 30, 2025

(54) HYDROPHOBIC TWISTED AND COILED POLYMER ACTUATORS

(71) Applicant: Toyota Motor Engineering & Manufacturing North America, Inc., Plano, TX (US)

(72) Inventors: Yuyang Song, Ann Arbor, MI (US); Umesh N. Gandhi, Farmington Hills, MI (US); Yonas Tadesse, Garland, TX (US); Pawandeep Singh Matharu, Dallas, TX (US)

(73) Assignees: Toyota Motor Engineering & Manufacturing North America, Inc., Plano, TX (US); Toyota Jidosha Kabushiki Kaisha, Toyota (JP); The University of Texas at Dallas, Richardson, TX (US)

(*) Notice: Subject to any disclaimer, the term of this patent is extended or adjusted under 35 U.S.C. 154(b) by 309 days.

(21) Appl. No.: 18/458,514

(22) Filed: Aug. 30, 2023

(65) Prior Publication Data

US 2025/0075686 A1  Mar. 6, 2025

(51) Int. Cl.
*F03G 7/06* (2006.01)

(52) U.S. Cl.
CPC .......... *F03G 7/0616* (2021.08); *F03G 7/062* (2021.08); *F05B 2280/2006* (2013.01); *F05B 2280/4003* (2013.01); *F05B 2280/6011* (2013.01)

(58) Field of Classification Search
CPC .............. F03G 7/0616; F03G 7/062; F05B 2280/2006; F05B 2280/4003; F05B 2280/6011
See application file for complete search history.

(56) References Cited

U.S. PATENT DOCUMENTS

| | | | |
|---|---|---|---|
| 10,480,491 B2 | 11/2019 | Li et al. | |
| 2013/0281291 A1* | 10/2013 | Pak | H01M 4/92 |
| | | | 252/502 |

(Continued)

OTHER PUBLICATIONS

Almubarak et al., "KryptoJelly: a Jellyfish Robot with Confined, Adjustable Pre-stress, and Easily Replaceable Shape Memory Alloy NiTi Actuators," Smart Materials and Structures, vol. 29, No. 7, pp. 1-22.

(Continued)

*Primary Examiner* — Tulsidas C Patel
*Assistant Examiner* — Mohammed Ahmed Qureshi
(74) *Attorney, Agent, or Firm* — Christopher G. Darrow; DARROW MUSTAFA PC

(57) ABSTRACT

An actuator includes a twisted and coiled polymer fishing line and an untwisted resistance heating wire ($TCP_{FL}^{RHW}$) actuator and a coating on the $TCP_{FL}^{HRW}$ actuator. The coating includes a mixture of carbon nanotubes, metal nanoparticles, and mesoporous carbon nanoparticles, and in some variations, the coating includes a polymer matrix with the carbon nanotubes, metal nanoparticles, and mesoporous carbon nanoparticles disposed in the polymer matrix. And the actuator exhibits enhanced actuator parameters such as actuator efficiency, hydrophobicity, power consumption, actuation frequency, dynamic actuation and cooling rate.

20 Claims, 6 Drawing Sheets

(56) References Cited

U.S. PATENT DOCUMENTS

| | | | |
|---|---|---|---|
| 2015/0219078 A1* | 8/2015 | Li | D02G 3/448 60/527 |
| 2019/0307919 A1 | 10/2019 | Lima et al. | |
| 2020/0088175 A1 | 3/2020 | Li et al. | |
| 2020/0191127 A1 | 6/2020 | Li et al. | |
| 2022/0003221 A1 | 1/2022 | Li et al. | |
| 2023/0078643 A1* | 3/2023 | Kongahage | A61F 2/50 623/14.13 |

OTHER PUBLICATIONS

Matharu et al., "Jelly-Z: Twisted and Coiled Polymer Muscle Actuated Jellyfish Robot for Environmental Monitoring," ACTA IMEKO, Sep. 2022, vol. 11, No. 3, pp. 1-7.

Piao et al., "Graphene/Silver Nanoflower Hybrid Coating for Improved Cycle Performance of Thermally-Operated Soft Actuators," Scientific Reports 10, article No. 17553, 2020, pp. 1-7.

Wu et al., "A novel soft actuator for the musculoskeletal system," Advanced Materials Technologies 3, 1700359, 2018, pp. 1-8.

Haines et al., "Artificial Muscles from Fishing Line and Sewing Thread," Science, vol. 343, No. 6173, pp. 868-872 (2014).

Piao et al., "Enhanced dynamic performance of twisted and coiled soft actuators using graphene coating," Composites Part B: Engineering, vol. 178, Dec. 2019, pp. 1-8.

Higueras-Ruiz et al., "Cavatappi artificial muscles from drawing, twisting and coiling polymer tubes," Science robotics, vol. 6, issue 53, Apr. 28, 2021, pp. 1-12.

Cherubini et al., "Experimental characterization of thermally-activated artificial muscles based on coiled nylon fishing lines," AIP Advances, vol. 5, issue 6, Jun. 2015, pp. 1-11.

Huber et al., "The Selection of Mechanical Actuators Based on Performance Indices," Proceedings of the Royal Society A: Mathematical, Physical and Engineering Sciences, vol. 453, issue 1965, 1997, pp. 2185-2205.

Hamidi et al., "Poly-saora robotic jellyfish: Swimming underwater by twisted and coiled polymer actuators," Smart Materials and Structures, vol. 29, 2020, pp. 1-24.

Hamidi et al., "Multidirectional 3D-printed functionally graded modular joint actuated by TCPFL muscles for soft robots," Bio-Design and Manufacturing, vol. 2, 2019, pp. 256-268.

Wu et al., A reconfigurable robot with tensegrity structure using nylon artificial muscles, Proceedings of SPIE, vol. 9799, May 2023, 12 pages.

Mu et al., "Sheath-run artificial muscles," Science, vol. 365, issue 6449, 2019, pp. 150-155.

Mirvakili et al., "Simple and Strong: Twisted Silver Painted Nylon Artificial Muscle Actuated by Joule Heating," Proceedings vol. 9056, Electroactive Polymer Actuators and Devices (EAPAD), Mar. 2014, pp. 1-10.

\* cited by examiner

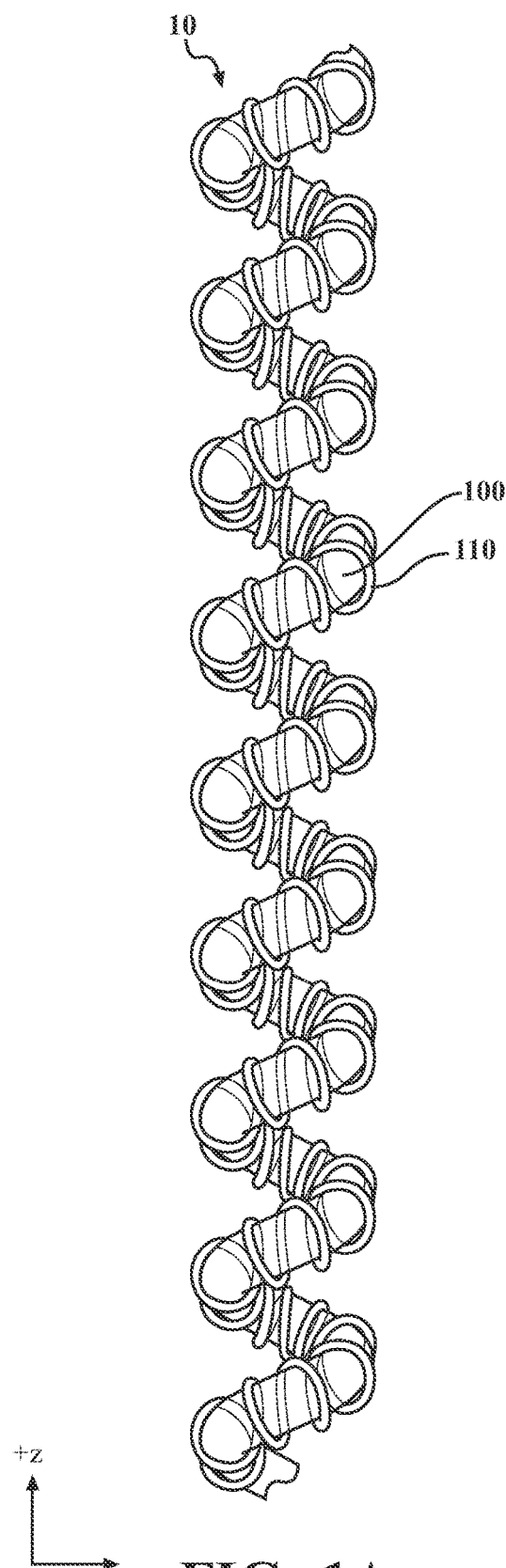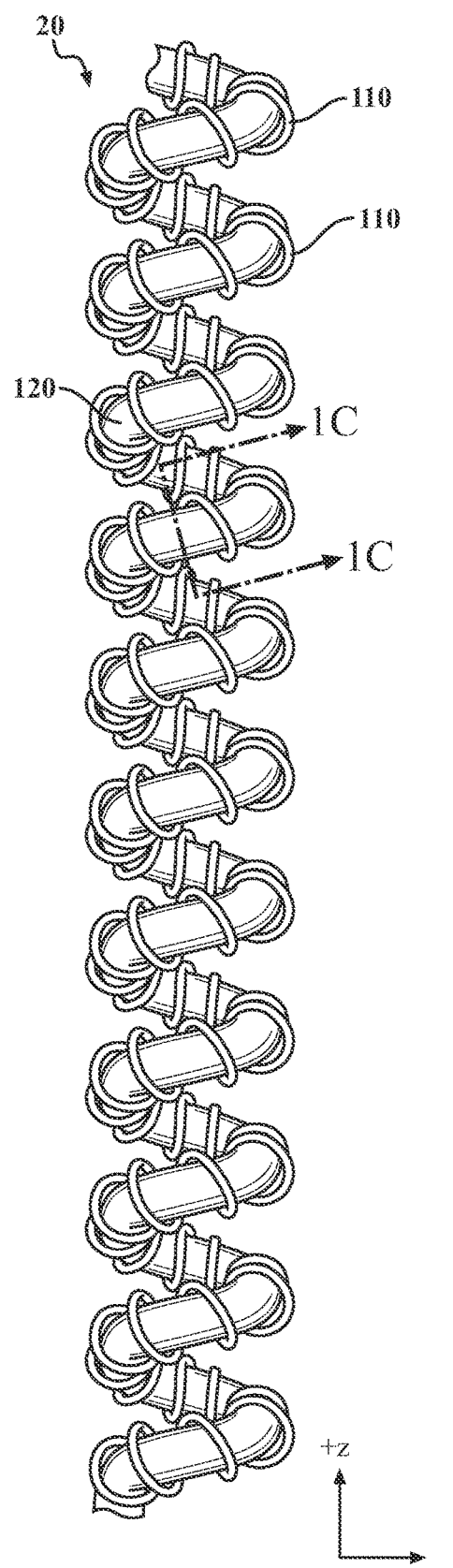
FIG. 1A
PRIOR ART
FIG. 1B

HYDROPHOBIC TWISTED AND COILED POLYMER ACTUATORS

TECHNICAL FIELD

The present disclosure generally relates to twisted and coiled polymer actuators.

BACKGROUND

Twisted and coiled polymer (TCP) actuators are strands of polymer that have been twisted and coiled under load to produce spring-like structures. In addition, TCP actuators exhibit negative thermal expansion through joule heating such that reversible expansion and contraction can be provided. Accordingly, TCP actuators have been proposed as artificial muscles for use in the fields of soft robotics, bionic devices, biology, medicine, and smart wearable clothing, among others. However, current TCP actuators require more power than desired and are particularly inefficient when sued in water due to an increase in heat loss during operation.

The present disclosure addresses these issues with TCP actuators, and other issues related to TCP actuators.

SUMMARY

In one form of the present disclosure, an actuator includes a twisted and coiled polymer fishing line and resistance heating wire ($TCP_{FL}^{RHW}$) actuator and a coating on the $TCP_{FL}^{HRW}$ actuator. The coating includes a mixture of carbon nanotubes, metal nanoparticles, and mesoporous carbon nanoparticles, and in some variations, the coating includes a polymer matrix with the carbon nanotubes, metal nanoparticles, and mesoporous carbon nanoparticles disposed in the polymer matrix.

In another form of the present disclosure, an actuator includes a $TCP_{FL}^{RHW}$ actuator with an untwisted resistance heating wire and a hydrophobic coating on the $TCP_{FL}^{HRW}$ actuator. The hydrophobic coating includes a mixture of a polymer matrix and carbon nanotubes, metal nanoparticles, and mesoporous carbon nanoparticles disposed in the polymer matrix.

In still another form of the present disclosure, an actuator includes a twisted and coiled polymer fishing line and untwisted resistance heating wire ($TCP_{FL}^{URHW}$) actuator and a hydrophobic coating on the $TCP_{FL}^{URHW}$ actuator. The coating includes a mixture of carbon nanotubes, nickel nanoparticles, and mesoporous carbon nanoparticles disposed in a polymer matrix. In some variations, the hydrophobic coating has a composition of between about 5.0 wt. % about 15.0 wt. % carbon nanotubes, between about 5.0 wt. % and about 15.0 wt. % metal nanoparticles, between about 30.0 wt. % and about 50.0 wt. % mesoporous carbon nanoparticles, and between about 30.0 wt. % and about 50 wt. % polyvinyl alcohol.

These and other features of TCP actuators will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein:

FIG. 1A illustrates a TCP fishing line coiled with an untwisted resistance heating wire ($TCP_{FL}^{URHW}$);

FIG. 1B illustrates a $TCP_{FL}^{URHW}$ actuator with a carbon nanotube-nanoparticle Ni-mesoporous carbon-polyvinyl alcohol (CNT-Ni-C-PVA) coating according to the teachings of the present disclosure;

It should be noted that the figures set forth herein is intended to exemplify the general characteristics of the methods, algorithms, and devices among those of the present technology, for the purpose of the description of certain aspects. The figure may not precisely reflect the characteristics of any given aspect and are not necessarily intended to define or limit specific forms or variations within the scope of this technology.

DETAILED DESCRIPTION

The present disclosure provides TCP actuators with enhanced energy efficiency in air and water. The TCP actuators include a twisted and coiled polymer fishing line ($TCP_{FL}$) with a resistance heating wire (e.g., a nichrome resistance heating wire) coiled with the $TCP_{FL}$ (referred to herein as $TCP_{FL}^{RHW}$). In some variations, the TCP actuators include a $TCP_{FL}$ with an untwisted resistance heating wire coiled with the $TCP_{FL}$ (referred to herein as $TCP_{FL}^{URHW}$). The TCP actuators also include a coating on the $TCP_{FL}^{RHW}$ or the $TCP_{FL}^{URHW}$. The coating has a heat transfer coefficient that is greater than a heat transfer coefficient for the $TCP_{FL}$ such that heating and cooling of the coated $TCP_{FL}^{RHW}$ or the coated $TCP_{FL}^{URHW}$ to actuate movement requires less energy (power) than actuating similar movement of the uncoated $TCP_{FL}^{RHW}$ or the uncoated $TCP_{FL}^{URHW}$. And in some variations, the coating is hydrophobic such that coated $TCP_{FL}^{RHW}$ or $TCP_{FL}^{URHW}$ actuators according to the teachings of the present disclosure are effectively shielded from water and do not experience of exhibit the rate of heat loss exhibited by uncoated $TCP_{FL}^{RHW}$ or $TCP_{FL}^{URHW}$ actuators.

Figure 1C:
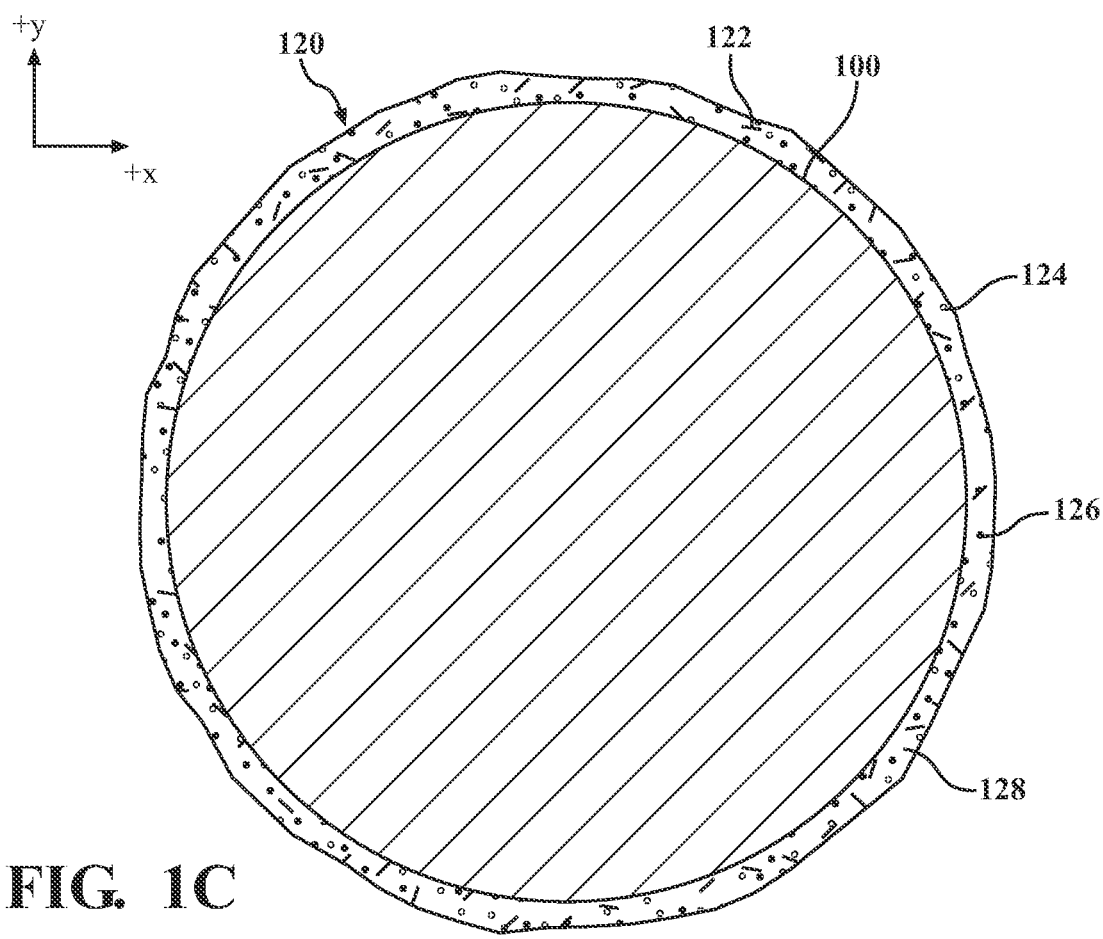
FIG. 1C illustrates a cross-sectional view of section 1C-1C in FIG. 1B without the presence of the resistance heating wire.

Referring to FIGS. 1A-1C, an uncoated $TCP_{FL}^{URHW}$ actuator 10 is shown in FIG. 1A, a coated $TCP_{FL}^{URHW}$ actuator 20 is shown in FIG. 1B, and a cross-sectional image of section 1C-1C in FIG. 1B is shown in FIG. 1C. As used herein, the phrases "uncoated $TCP_{FL}^{URHW}$ actuator" refers to a $TCP_{FL}^{URHW}$ without the coating described below and the phrase "coated $TCP_{FL}^{URHW}$ actuator" refers to a $TCP_{FL}^{HRW}$ with a coating according to the teachings of the present disclosure.

The uncoated $TCP_{FL}^{URHW}$ actuator 10 includes a $TCP_{FL}$ 100 coiled with an untwisted resistance heating wire 110 and the coated $TCP_{FL}^{URHW}$ actuator 20 includes the $TCP_{FL}$ 100, the untwisted resistance heating wire 110, and a coating 120. In some variations, the coating 120 includes carbon nanotubes (CNT) 122, metal particles 124, and carbon particles 126. In at least one variation, the carbon nanotubes 122, metal particles 124, and the carbon particles 126 are disposed in a matrix 128, e.g., a monomer or polymer matrix. In some variations, the metal particles 124 are nickel particles, and in at least one variation the metal particles are nickel nanoparticles. However, in other variations the metal particles 124 can be any material having desired/good electrical and/or heat conductivity such as silver nanoparticles, gold nanoparticles, platinum nanoparticles, among others. Also, in some variations the carbon particles 126 are carbon mesoporous particles, and in at least one variation the carbon particles 126 are mesoporous carbon nanoparticles. And in at least one variation the monomer or polymer matrix includes a water soluble polymer such as polyvinyl alcohol (PVA), polyethylene glycol, a polyacrylamide, a polyacrylic acid copolymer, an epoxy, a gelatin, and a glycerin glue, among others.

In some variations, the coating 120 has a composition with between about 2.0 weight percent (wt. %) and about 20.0 wt. % CNT, between about 2.0 wt. % and about 20.0 wt. % metal particles, and between about 20.0 and about 60.0 wt. % carbon particles. In at least one variation, the coating 120 has a composition with between about 5.0 wt. % about 15.0 wt. % CNT, between about 5.0 wt. % and about 15.0 wt. % metal particles, and between about 30.0 wt. % and about 50.0 wt. % carbon particles. For example, in some variations the coating has an overall composition of between about 2.0 weight percent (wt. %) and about 20.0 wt. % CNT, between about 2.0 wt. % and about 20.0 wt. % metal particles, between about 20.0 and about 60.0 wt. % carbon particles, and between about 20.0 wt. % and about 60.0 wt. % polymer matrix. In at least one variation, the coating 120 has an overall composition with between about 5.0 wt. % about 15.0 wt. % CNT, between about 5.0 wt. % and about 15 wt. % metal particles, between about 30.0 wt. % and about 50.0 wt. % carbon particles, and between about 30.0 wt. % and about 50.0 wt. % polymer matrix. And in some variations, the coating 120 has an overall composition with between about 7.5 wt. % about 12.5 wt. % CNT, between about 7.5 wt. % and about 12.5 wt. % metal particles, between about 35.0 wt. % and about 45.0 wt. % carbon particles, and between about 35.0 wt. % and about 45.0 wt. % polymer matrix.

Not being bound by theory, the coating 120 enhances joule heating of the $TCP_{FL}$ 100. For example, the heat transfer coefficients of the CNT 122 and the metal particles 124 are greater than the heat transfer of the $TCP_{FL}$ 100 such that heat from joule heating of the untwisted resistance heating wire 110 is distributed or transferred faster and/or more efficiently to the $TCP_{FL}$ 100 when the coating 120 is on the $TCP_{FL}$ 100 compared to when the coating 120 is not on the $TCP_{FL}$ 100. In addition, when the carbon particles 126 are mesoporous carbon nanoparticles, the mesoporous carbon nanoparticles are hydrophobic and provide a porous structure that aids or enhances bonding between the CNT 122, the metal particles 124, and/or the matrix 128.

During use or operation of the uncoated $TCP_{FL}^{URHW}$ actuator 10 and/or the coated $TCP_{FL}^{URHW}$ actuator 20, electrical current flows through the untwisted resistance heating wire 110 and is heated via joule heating, heat transfer from the untwisted resistance heating wire 110 to the $TCP_{FL}$ 100, and the $TCP_{FL}$ 100 increases in temperature and decreases in length due to the negative coefficient of thermal expansion of the polymer fishing line. Stated differently, the $TCP_{FL}^{URHW}$ actuator 10 and/or the coated $TCP_{FL}^{URHW}$ actuator 20 decrease in length when heated. Then, the electrical current flowing through the resistance heating wire 110 is terminated, the resistance heating wire 110 and the $TCP_{FL}$ 100 cool (decrease in temperature), and the $TCP_{FL}$ 100 increases in length. Stated differently, the $TCP_{FL}^{URHW}$ actuator 10 and/or the coated $TCP_{FL}^{URHW}$ actuator 20 increase in length during cooling. Accordingly, the uncoated $TCP_{FL}^{URHW}$ actuator 10 and the coated $TCP_{FL}^{URHW}$ actuator 20 contract like a muscle when actuated (heated) and relax like a muscle when cooled. However, and as explained in greater detail below, the coated $TCP_{FL}^{URHW}$ actuator 20 exhibits enhanced properties compared to the $TCP_{FL}^{URHW}$ actuator 10.

The uncoated $TCP_{FL}^{URHW}$ actuator 10 and the coated $TCP_{FL}^{URHW}$ actuator 20 can be formed or manufactured using known $TCP_{FL}^{URHW}$ manufacturing techniques such as described in the reference "A novel soft actuator for the musculoskeletal system", Wu et al., *Advanced Materials Technologies* 3, No. 5 (2018): 1700359, which is incorporated herein in its entirety by reference. For example, in some variations the $TCP_{FL}^{URHW}$ actuators disclosed herein can be manufactured by first inserting "twist" into a polymer fishing line, wrapping an untwisted resistance heating wire onto the twisted polymer fishing line, mandrel coiling the twisted polymer fishing line with the wrapped and untwisted resistance heating wire about a mandrel, and thermal annealing the coiled twisted polymer fishing line with the wrapped and untwisted resistance heating wire to form a $TCP_{FL}^{URHW}$ actuator 10 as shown in FIG. 1A.

Regarding inserting twist into the polymer fishing line, in some variations a first or upper end of a polymer fishing line with a predefined length is attached to a first motor shaft and the second or bottom end of the polymer fishing line is attached to a predefined weight such that the polymer fishing line hangs or extends vertically from the motor shaft. Then, the motor is rotated at a predefined speed in a given direction (e.g., a counterclockwise direction) such the polymer fishing line is twisted, i.e., a twist is inserted in the polymer fishing line. As the polymer fishing line is twisted, it shrinks in length, and when coiling in the polymer fishing line is observed, rotation of the first motor is stopped and the "twist insertion" of the polymer fishing line is concluded.

Regarding incorporating or wrapping the resistance heating wire with the twisted polymer fishing line, in some variations an untwisted polymer fishing line with the predefined weight is attached to the bottom end of the twist inserted polymer fishing line and an untwisted resistance heating wire with a predefined length is attached to the first motor shaft. Then, both the twisted polymer fishing line and the untwisted resistance heating wire are placed within a guide carriage with a guide rod and the first motor is rotated at predefined speed as the guide carriage and guide rod move down along the twisted polymer fishing line such that the untwisted resistance heating wire is wrapped around the twisted polymer fishing line with a predefined pitch.

Regarding mandrel coiling of the twisted polymer fishing line with the wrapped and untwisted resistance heating wire, a mandrel with a predefined diameter is coupled to a second motor, the upper end of the twisted polymer fishing line with the wrapped and untwisted resistance heating wire is attached to the mandrel, and the mandrel is rotated in a predefined direction such that the twisted polymer fishing line with the wrapped and untwisted resistance heating wire coils about or around the mandrel. In some variations, the mandrel is rotated in a predefined direction (e.g., counterclockwise) such that the resulting $TCP_{FL}^{URHW}$ functions as a homochiral muscle, while in other variations the mandrel is rotated in a predefined direction (e.g., clockwise) such that the resulting $TCP_{FL}^{URHW}$ functions as a heterochiral muscle.

Regarding thermal annealing the coiled twisted polymer fishing line with the wrapped and untwisted resistance heating wire, in some variations, the mandrel with the coiled polymer fishing line and the wrapped and untwisted resistance heating wire coiled thereabout is placed in a furnace at a predefined temperature for a predefined period of time. And after annealing, a $TCP_{FL}^{URHW}$ actuator such as the $TCP_{FL}^{URHW}$ actuator 10 shown in FIG. 1A is provided.

In some variations, the polymer fishing line a nylon 6 monofilament fishing line and the resistance heating wire is a nichrome resistance wire with a predefined diameter, e.g., about a diameter equal to about 160 micrometers (µm). As used herein, the phrase "nichrome resistance wire" refers to resistance heating wire containing nickel and chromium, for example, about 80 wt. % nickel and about 20 wt. % chromium with incidental impurities.

Regarding manufacturing coated $TCP_{FL}^{URHW}$ actuators disclosed herein, a $TCP_{FL}^{URHW}$ actuator as described above is coated with a CNT-M-C coating mixture and then annealed to form a coated $TCP_{FL}^{URHW}$ actuator. In some variations, the CNT-M-C coating mixture is formed from a mixture of polyvinyl alcohol (PVA), metal (e.g., nickel) nanoparticles, CNT, and mesoporous carbon dust. For example, in at least one variation, 1 gram of PVA is mixed and stirred with 100 milliliters of distilled water at 75-80° C. for 15-20 minutes until a clear solution is observed. Then, 1 gram of mesoporous carbon dust with an average particle diameter of less than 500 nanometers (nm), 0.25 grams of CNT with an average diameter 8.7-10.0 nm, and 0.25 grams of nickel nanoparticles with an average diameter less than 100 nm are added to the PVA+water solution at 65° C. and stirred for 1-2 hours, followed by continued stirring while the CNT-Ni-C-PVA-water solution cools to room temperature. Then, the CNT-Ni-C-PVA-water solution is centrifuged for 20 minutes at room temperature and the supernatant is separated or removed such that a pellet of the CNT-Ni-C-PVA is provided. In some variations, some of the supernatant is used to re-dissolve the CNT-Ni-C-PVA pellet to form a CNT-Ni-C-PVA coating solution and a $TCP_{FL}^{URHW}$ actuator is immersed in the CNT-Ni-C-PVA coating solution, shaken rigorously for 4-5 minutes, and then annealed at 80° C. for 1 hour such that a CNT-M-C coated $TCP_{FL}^{URHW}$ actuator 20 as shown in FIG. 1B is provided.

Figure 2:
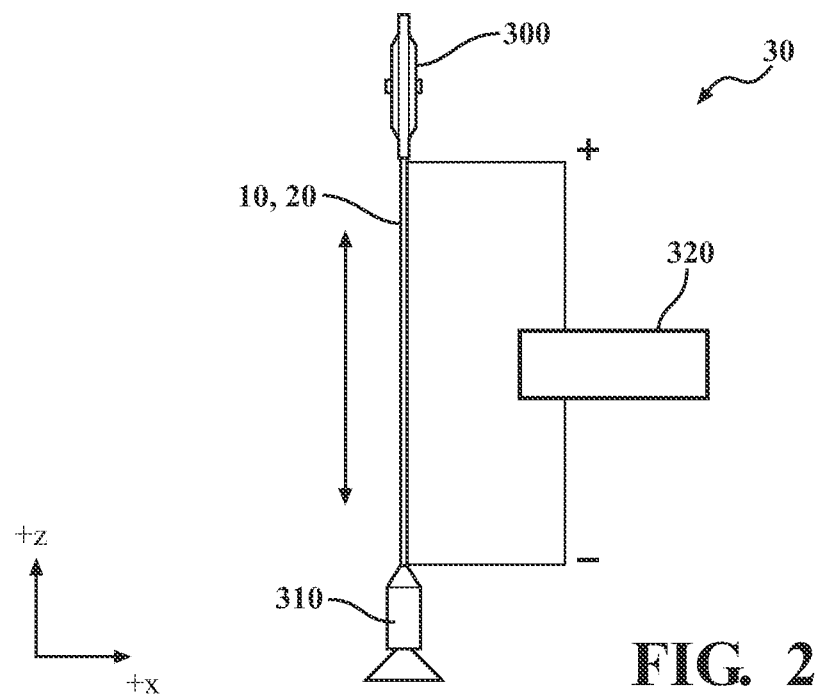
FIG. 2 illustrates a testing apparatus for measuring properties of uncoated and coated $TCP_{FL}^{URHW}$ actuators.

In order to better understand the properties of coated $TCP_{FL}^{URHW}$ actuators according to the teachings of the present disclosure and the effects or enhancements provided by the coating 120, testing of uncoated $TCP_{FL}^{URHW}$ actuators 10 and coated $TCP_{FL}^{URHW}$ actuators 20 were performed using the test apparatus 30 illustrated in FIG. 2. Particularly, the test apparatus 30 included a hook 300, a weight 310, and a power supply 320 such that testing of tensile actuation, dynamical performance in air and water, thermal hysteresis, and actuator efficiency of coated $TCP_{FL}^{URHW}$ actuators 20 (coated pre the example discussed above) was performed and compared to uncoated $TCP_{FL}^{URRW}$ actuators 10.

Figure 3A:
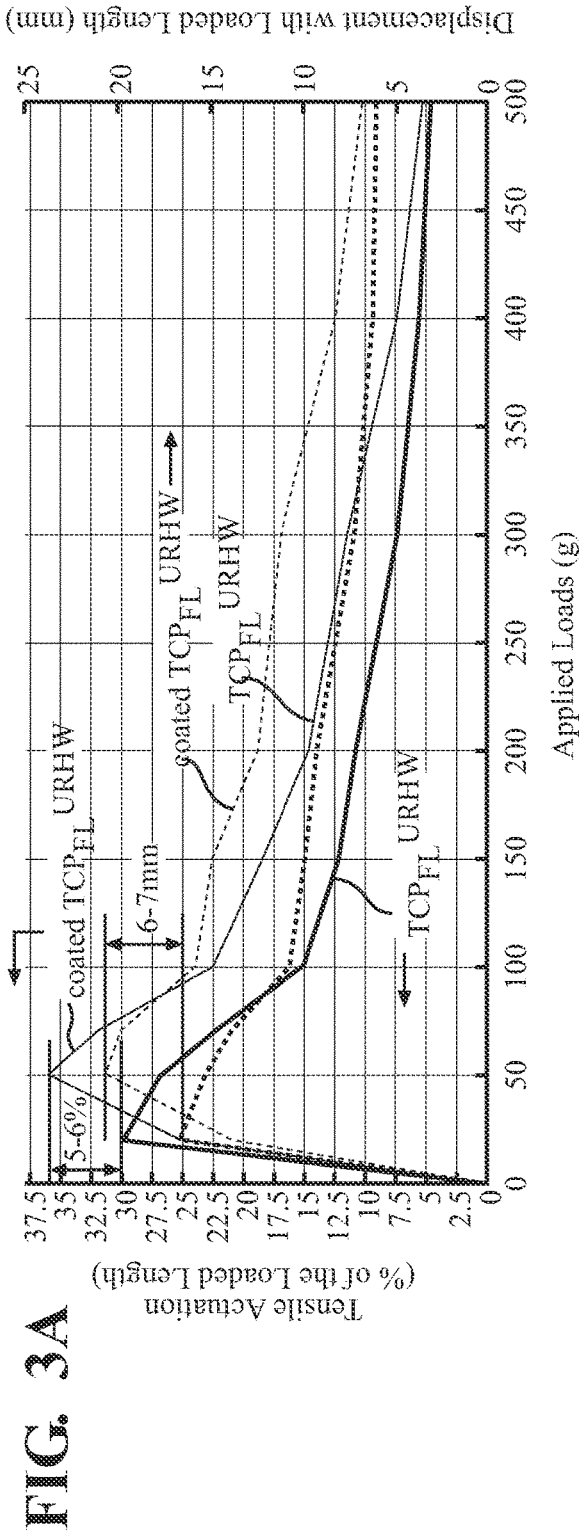
FIG. 3A is a graphical plot of percent (%) tensile actuation and actual displacement for an uncoated $TCP_{FL}^{URHW}$ actuator and a CNT-Ni-C-PVA coated $TCP_{FL}^{URHW}$ actuator as a function of applied load, a 0.025 Hz actuation cycle (12 seconds heating and 28 seconds cooling), and maximum input power sustainable.

Referring to FIG. 3A, tensile actuations (i.e., % of loaded length) and actual displacements, for both an uncoated $TCP_{FL}^{URHW}$ actuator 10 and a coated $TCP_{FL}^{URHW}$ actuator 20, as a function of applied load and maximum sustainable input power are shown. The maximum displacement for the coated $TCP_{FL}^{URHW}$ actuator 20 was about 32 millimeters (mm) and occurred at a 50 gram load, while the maximum displacement for the uncoated $TCP_{FL}^{URHW}$ actuator 10 was about 25 mm and occurred at 20 gram load. In addition, the optimal range of actuation for the uncoated $TCP_{FL}^{URHW}$ actuator 10 and the coated $TCP_{FL}^{URHW}$ actuator 20 was for loads between 20 grams to 100 grams. The loaded length of the uncoated $TCP_{FL}^{URHW}$ actuator 10 and the coated $TCP_{FL}^{URHW}$ actuator 20 was directly proportional to applied loads and the amount of power required by the coated $TCP_{FL}^{URHW}$ actuator 20 was about 31% less than the $TCP_{FL}^{URHW}$ actuator 10 per the calculation below:

$$\% \text{ improvment (input power)} = \frac{\text{Power for } TCP_{FL}^{HRW} - \text{Power for coated } TCP_{FL}^{HRW}}{\text{Power for } TCP_{FL}^{HRW}} \times 100\%$$

$$= \frac{(4.9) - (3.375)}{4.9} \times 100 = 31.1\%$$

In addition, the maximum percentage of actuation strain for a constant load of 50 gram for the coated $TCP_{FL}^{URHW}$ actuator 20 was about 36% when energized with 0.27 A and 12.5 V (time period of 40 s and a duty cycle of 30%) and about 20% more than the actuation strain (about 5 to 6% difference) achieved for the uncoated $TCP_{FL}^{URHW}$ actuator 10 energized with 0.35 A and 14 V. It should be understood that the $TCP_{FL}^{URHW}$ actuator 10 and the coated $TCP_{FL}^{URHW}$ actuators 20 were powered up to the maximum capacity. It should also be understood that the applied load is an important parameter with respect to the tensile strain of a $TCP_{FL}^{URHW}$ actuator since the $TCP_{FL}^{URHW}$ actuators exhibit considerable elongation under increasing load.

Figure 3B:
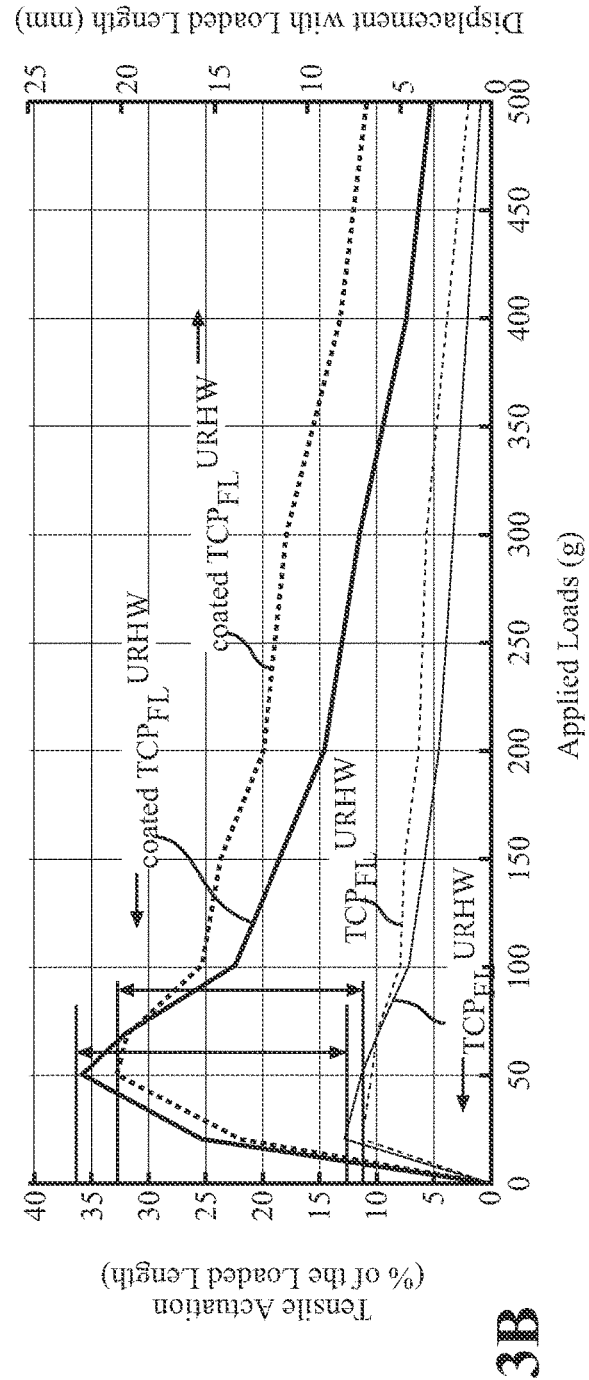
FIG. 3B is a graphical plot of % tensile actuation and actual displacement for an uncoated $TCP_{FL}^{URHW}$ actuator and a CNT-Ni-C-PVA coated $TCP_{FL}^{URHW}$ actuator as a function of applied load, a 0.025 Hz actuation cycle (12 seconds heating and 28 seconds cooling), and equal input power.

Referring to FIG. 3B, the enhanced tensile actuation of the coated $TCP_{FL}^{URHW}$ actuator 20 compared to the uncoated $TCP_{FL}^{URHW}$ actuator 10, given the same input power (0.27 A, 12.5V) provided to each actuator having the same length of 54 mm, is shown. Particularly, the coated $TCP_{FL}^{URHW}$ actuator 20 exhibited about a 200% increase in % tensile actuation and about a 180% increase in actual displacement (measured from loaded length) compared to the uncoated $TCP_{FL}^{URHW}$ actuator 10 measured at optimal loads for each actuator.

Figure 4A:
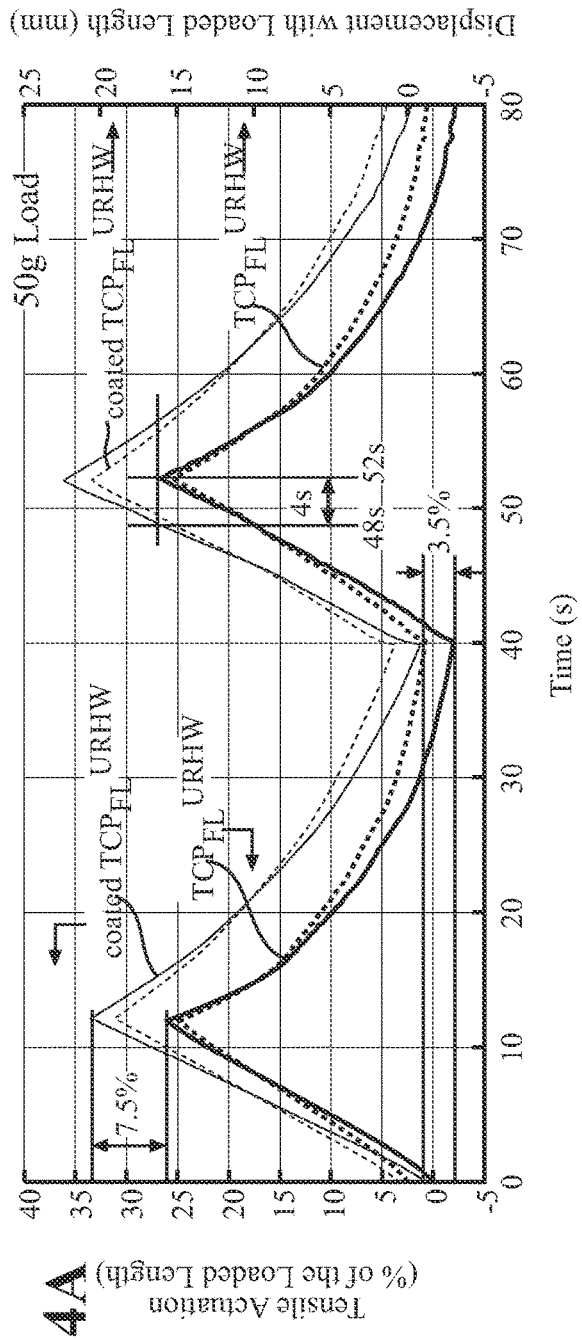
FIG. 4A is graphical plot of the dynamical performance for an uncoated $TCP_{FL}^{URHW}$ actuator and a CNT-Ni-C-PVA coated $TCP_{FL}^{URHW}$ actuator subjected to a 50 gram load, a 0.025 Hz actuation cycle (12 seconds heating and 28 seconds cooling), and with 4.9 watts (W) of power applied to the uncoated $TCP_{FL}^{URHW}$ actuator and 3.375 W of power applied to the CNT-Ni-C-PVA coated $TCP_{FL}^{URHW}$ actuator.
Figure 4B:
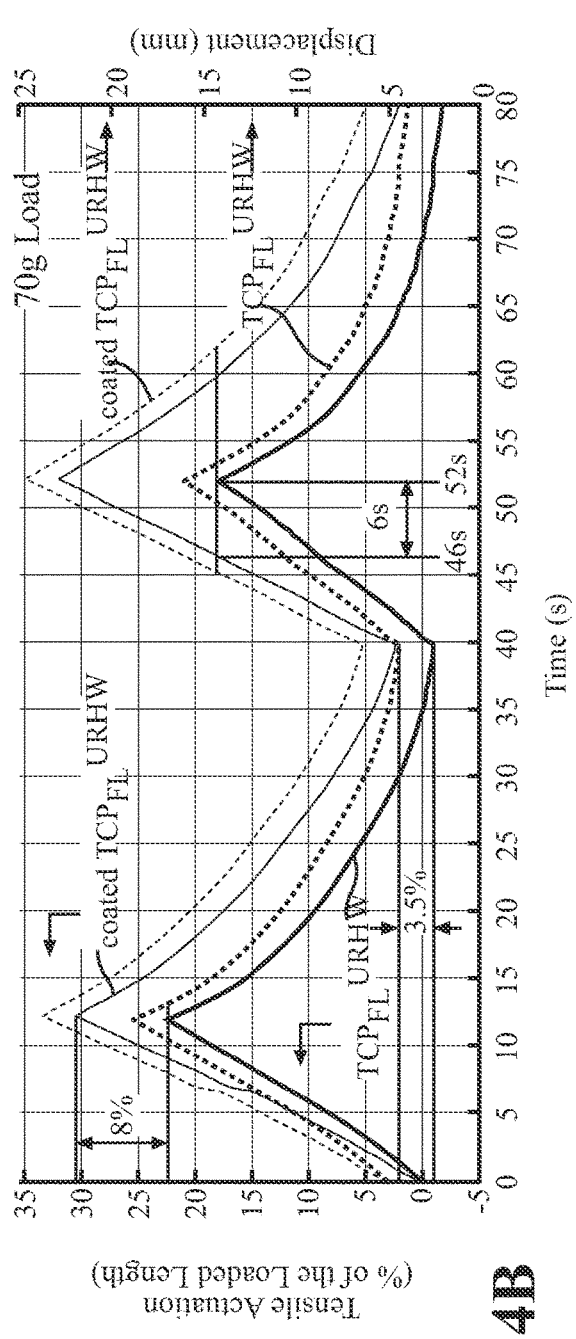
FIG. 4B is graphical plot of the dynamical performance for an uncoated $TCP_{FL}^{URHW}$ actuator and a CNT-Ni-C-PVA coated $TCP_{FL}^{URHW}$ actuator subjected to a 70 gram load, a 0.025 Hz actuation cycle (12 seconds heating and 28 seconds cooling), and with 4.9 W applied to the uncoated $TCP_{FL}^{URHW}$ actuator and 3.375 W applied to the CNT-Ni-C-PVA coated $TCP_{FL}^{URHW}$ actuator.
Figure 4C:
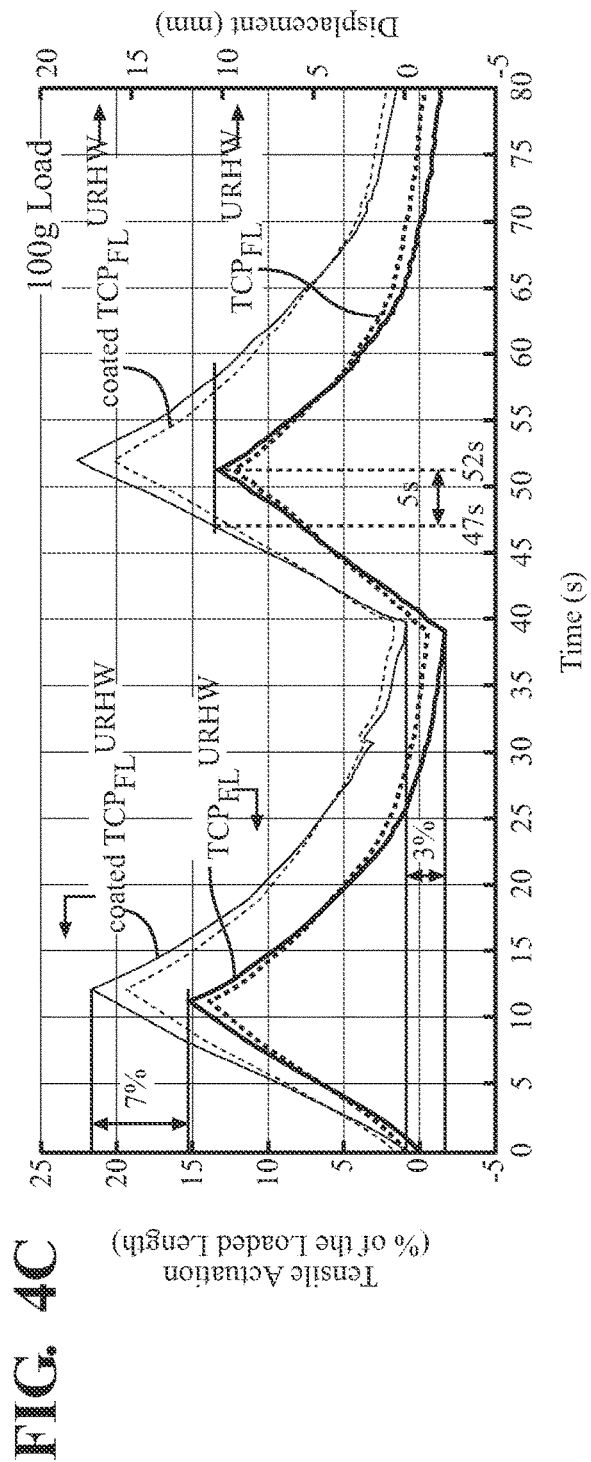
FIG. 4C is graphical plot of the dynamical performance for an uncoated $TCP_{FL}^{URHW}$ and a CNT-Ni-C-PVA coated $TCP_{FL}^{URHW}$ subjected to a 100 gram load, a 0.025 Hz actuation cycle (12 seconds heating and 28 seconds cooling), and with 4.9 W applied to the uncoated $TCP_{FL}^{URHW}$ actuator and 3.375 W applied to the CNT-Ni-C-PVA coated $TCP_{FL}^{URHW}$ actuator.

Referring now to FIGS. 4A-4C, dynamic performances of an uncoated $TCP_{FL}^{URHW}$ actuator 10 and a coated $TCP_{FL}^{URHW}$ actuator 20 under 50 gram, 70 gram, and 100 gram loads, respectively, are shown. The uncoated $TCP_{FL}^{URHW}$ actuator 10 and the coated $TCP_{FL}^{URHW}$ actuator 20 were energized with 4.9 W and 3.375 W of power, respectively, for 12 seconds, followed by cooling for 28 seconds (0.025 Hz).

Referring particularly to FIG. 4A, the coated $TCP_{FL}^{URHW}$ actuator 20 reached the maximum tensile strain value of the uncoated $TCP_{FL}^{URHW}$ actuator 10 about 4 seconds faster when both actuators were under the 50 gram load. Also, for the 70 gram load (FIG. 4B) the coated $TCP_{FL}^{URHW}$ actuator 20 reached the maximum tensile strain value of the uncoated $TCP_{FL}^{URHW}$ actuator 10 about 6 seconds faster, and for the 100 gram weight (FIG. 4C) the coated $TCP_{FL}^{URHW}$ actuator 20 reached the maximum tensile strain value of the uncoated $TCP_{FL}^{URHW}$ actuator 10 about 5 seconds faster. Accordingly, dynamic response of the coated $TCP_{FL}^{URHW}$ actuator 20 was between 4-6 seconds, or between 33 to 55%, faster than the uncoated $TCP_{FL}^{URHW}$ actuator 10. Accordingly, the coated $TCP_{FL}^{URHW}$ actuator 20 dynamically responds at least a 25% faster than the uncoated $TCP_{FL}^{URHW}$ actuator 10, e.g., at least 30% faster than the uncoated $TCP_{FL}^{URHW}$ actuator 10, at least a 40% faster than the uncoated $TCP_{FL}^{URHW}$ actuator 10, and/or at least a 50% faster than the uncoated $TCP_{FL}^{URHW}$ actuator 10.

In addition, FIGS. 4A-4C illustrate the coated $TCP_{FL}^{URHW}$ actuator 20 exhibited between about 7.5-8% more actuation strain than the uncoated $TCP_{FL}^{URHW}$ actuator 10 with about 31% less input power applied thereto.

Figure 5:
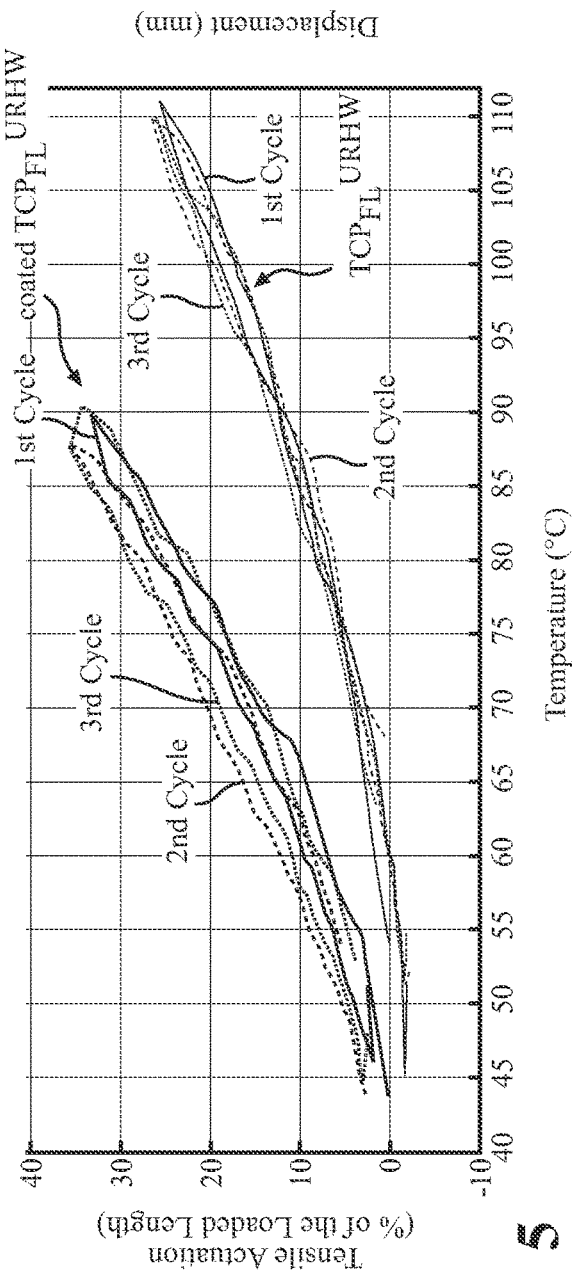
FIG. 5 is a graphical plot of thermal hysteresis (% tensile actuation as a function of heating and cooling) for an uncoated $TCP_{FL}^{URHW}$ actuator and a CNT-Ni-C-PVA coated $TCP_{FL}^{URHW}$ actuator subjected to a 50 gram load.

Referring to FIG. 5, thermal hysteresis of the uncoated $TCP_{FL}^{URHW}$ actuator 10 and the coated $TCP_{FL}^{URHW}$ actuator 20 are shown. Particularly, three cycles of each actuator being energized (heated) for 12 seconds followed by cooling for 28 seconds is shown. The top part of each curve corresponds to the heating phase and the bottom part of each curve corresponds to the cooling phase. And as observed for the coated $TCP_{FL}^{URHW}$ actuator 20 actuator, the rise in its temperature is less than for the uncoated $TCP_{FL}^{URHW}$ actuator 10, and yet the coated $TCP_{FL}^{URHW}$ actuator 20 actuation strain was more than for the uncoated $TCP_{FL}^{URHW}$ actuator 10 due to the enhanced heat transfer provided by the coating 120. In addition, the hysteresis curves for the coated $TCP_{FL}^{URHW}$ actuator 20 are wider (i.e., Δ % tensile actuation) than the hysteresis curves for the uncoated $TCP_{FL}^{URHW}$ actuator 10, thereby illustrating the enhanced cooling provided by the coating 120 on the coated $TCP_{FL}^{URHW}$ actuator 20.

Figure 6:
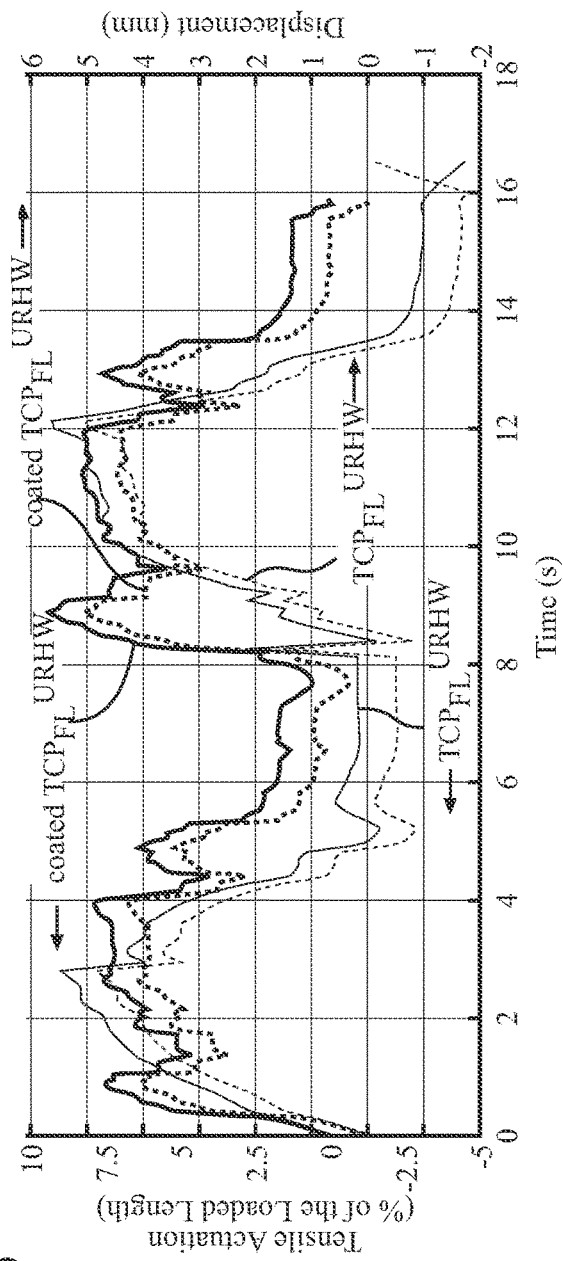
FIG. 6 is graphical plot of the dynamical performance in water for an uncoated $TCP_{FL}^{URHW}$ actuator and a CNT-Ni-C-PVA coated $TCP_{FL}^{URHW}$ subjected to a 50 gram load, a 0.125 Hz actuation cycle (4 seconds heating and 4 seconds cooling), and with 97 W applied to the uncoated $TCP_{FL}^{URHW}$ actuator and 60 W applied to the CNT-Ni-C-PVA coated $TCP_{FL}^{URHW}$ actuator.

Referring to FIG. 6, comparison an uncoated $TCP_{FL}^{URHW}$ actuator 10 and a coated $TCP_{FL}^{URHW}$ actuator actuated in water under a 50 gram load is shown. Both the uncoated $TCP_{FL}^{URHW}$ actuator 10 and the coated $TCP_{FL}^{URHW}$ actuator 20 had a length of 54 mm, and as noted above, the coating 120 is hydrophobic and thus shields the $TCP_{FL}$ 100 from water and heat loss between the $TCP_{FL}$ 100 and the water is reduced. The coated $TCP_{FL}^{URHW}$ actuator 20 was actuated with 60 W (1.1 A, 55V) and the uncoated $TCP_{FL}^{URHW}$ actuator 10 was actuated with 97 W (1.7 A, 57V). However, both actuators exhibited the same amount of actuation strain (about 9-10%) for an actuation frequency of 0.125 Hz (4 s heating, 4 s cooling). Accordingly, the coated $TCP_{FL}^{URHW}$ actuator 20 actuator provides the same amount of tensile actuation as the uncoated $TCP_{FL}^{URHW}$ actuator 10 with about 38% less power input.

Figure 7:
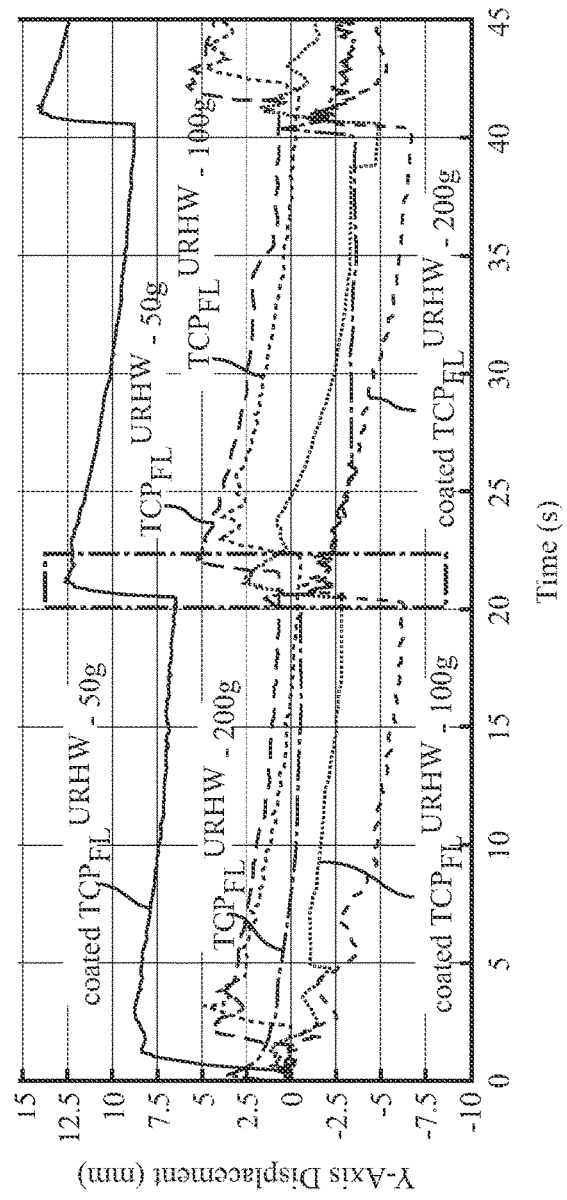
FIG. 7 is a graphical plot of actuator efficiency for an uncoated $TCP_{FL}^{URHW}$ actuator and a CNT-Ni-C-PVA coated $TCP_{FL}^{URHW}$ actuator subjected to 50 gram, 100 gram, and 200 gram loads, and 20 millisecond pulses of 2.2 Amps and 30 volts.

Referring to FIG. 7, energy conversion efficiencies for the coated $TCP_{FL}^{URHW}$ actuator 20 and the uncoated $TCP_{FL}^{URHW}$ actuator 10 were evaluated using the heaviest load allowing reversible actuation and short actuation power pulses of 2.2 A and 30V for 20 ms to limit thermal dissipation. And as observed from FIG. 7, the coated $TCP_{FL}^{URHW}$ actuator 20 contracted 6.32 mm against a 200 g load to provide 12.38 mJ of work against gravity and the uncoated $TCP_{FL}^{URHW}$ actuator 10 contracted 3.87 mm against a 200 g load to provide 7.52 mJ of work against gravity. Accordingly, the coated $TCP_{FL}^{URHW}$ actuator 20 exhibited a 0.92% conversion efficiency while the uncoated $TCP_{FL}^{URHW}$ actuator 10 exhibited 0.57% conversion efficiency per the following equation(s):

$$\% \text{ energy conversion efficiency} = \frac{\text{mechancial work output}}{\text{energy input}} \times 100$$
$$= \frac{\text{force (N)} \times \text{dispacement (mm)}}{\text{appliee voltage (V)} \times \text{input current (A)} \times \text{time (ms)}} \times 100$$

Accordingly, in some variations the coated $TCP_{FL}^{URHW}$ actuator 20 exhibits at least a 50% energy conversion efficiency improvement compared to the uncoated $TCP_{FL}^{URHW}$ actuator 10, and in at least one variation the coated $TCP_{FL}^{URHW}$ actuator 20 exhibits at least a 60% energy conversion efficiency improvement compared to the uncoated $TCP_{FL}^{URHW}$ actuator 10.

In addition to the above, the coated $TCP_{FL}^{URHW}$ actuator 20 and the uncoated $TCP_{FL}^{URHW}$ actuator 10 were subjected to lifecycle testing by subjecting each actuator to cycles of heating and cooling with an actuation frequency of 0.038 Hz (6 s heat, 20 s cool). The coated $TCP_{FL}^{URHW}$ actuator 20 was subjected to about 210,000 cycles at 0.1 Hz actuation frequency (more than 2 weeks) of continuous actuation without failing before testing was terminated, while the uncoated $TCP_{FL}^{URHW}$ actuator 10 failed after about 20,000 cycles. Accordingly, the coated $TCP_{FL}^{URHW}$ actuator 20 showed at least a 150% increase in lifecycle operation compared to the uncoated $TCP_{FL}^{URHW}$ actuator 10.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should also be understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. An actuator comprising:
   a twisted and coiled polymer fishing line and resistance heating wire ($TCP_{FL}^{RHW}$) actuator; and
   a coating on the $TCP_{FL}^{RHW}$ actuator, the coating comprising a mixture of carbon nanotubes, metal nanoparticles, and mesoporous carbon nanoparticles.

2. The actuator according to claim 1, wherein the resistance heating wire is an untwisted resistance heating wire.

3. The actuator according to claim 1, wherein the resistance heating wire is a nichrome heating wire.

4. The actuator according to claim 1, wherein the coating is hydrophobic.

5. The actuator according to claim 1, wherein the coating comprises a polymer matrix.

6. The actuator according to claim 5, wherein the polymer matrix is a polyvinyl alcohol matrix.

7. The actuator according to claim 1, wherein the coating further comprises a polymer matrix and has a composition of between about 5.0 wt. % about 15.0 wt. % carbon nanotubes, between about 5.0 wt. % and about 15.0 wt. % metal nanoparticles, between about 30.0 wt. % and about 50.0 wt. % mesoporous carbon nanoparticles, and between about 30.0 wt. % and about 50.0 wt. % polyvinyl alcohol.

8. The actuator according to claim 1, wherein the coating further comprises a polymer matrix and has a composition of between about 7.5 wt. % about 12.5 wt. % carbon nanotubes, between about 7.5 wt. % and about 12.5 wt. % metal nanoparticles, between about 35.0 wt. % and about 45.0 wt. % mesoporous carbon nanoparticles, and between about 35.0 wt. % and about 45.0 wt. % polyvinyl alcohol.

9. The actuator according to claim 1, wherein the $TCP_{FL}^{RHW}$ actuator with the coating exhibits at least a 50% energy conversion efficiency improvement compared to the $TCP_{FL}^{RHW}$ actuator without the coating.

10. The actuator according to claim 9, wherein the $TCP_{FL}^{RHW}$ actuator with the coating exhibits at least a 60% energy conversion efficiency improvement compared to the $TCP_{FL}^{RHW}$ actuator without the coating.

11. The actuator according to claim 1, wherein the $TCP_{FL}^{RHW}$ actuator with the coating dynamically responds at least 25% faster than the $TCP_{FL}^{RHW}$ actuator without the coating.

12. The actuator according to claim 1, wherein the $TCP_{FL}^{RHW}$ actuator with the coating dynamically responds at least 30% faster than the $TCP_{FL}^{RHW}$ actuator without the coating.

13. The actuator according to claim 1, wherein the $TCP_{FL}^{RHW}$ actuator with the coating dynamically responds at least 40% faster than the $TCP_{FL}^{RHW}$ actuator without the coating.

14. The actuator according to claim 1, wherein the $TCP_{FL}^{RHW}$ actuator with the coating dynamically responds at least 50% faster than the $TCP_{FL}^{RHW}$ actuator without the coating.

15. The actuator according to claim 1, wherein the $TCP_{FL}^{RHW}$ actuator with the coating comprises an actuation frequency between about 0.1 Hz and about 1.0 Hz.

16. An actuator comprising:
    a twisted and coiled polymer fishing line and untwisted resistance heating wire ($TCP_{FL}^{URHW}$) actuator; and
    a hydrophobic coating on the $TCP_{FL}^{URHW}$ actuator, the hydrophobic coating comprising a mixture of a polymer matrix and carbon nanotubes, metal nanoparticles, and mesoporous carbon nanoparticles disposed in the polymer matrix.

17. The actuator according to claim 16 wherein the metal nanoparticles comprise nickel nanoparticles and the polymer matrix comprises polyvinyl alcohol.

18. The actuator according to claim 17, wherein the hydrophobic coating has a composition of between about 5.0 wt. % about 15.0 wt. % carbon nanotubes, between about 5.0 wt. % and about 15.0 wt. % metal nanoparticles, between about 30.0 wt. % and about 50.0 wt. % mesoporous carbon nanoparticles, and between about 30.0 wt. % and about 50 wt. % polyvinyl alcohol.

19. An actuator comprising:
a twisted and coiled polymer fishing line and untwisted resistance heating wire ($TCP_{FL}^{URHW}$) actuator; and
a hydrophobic coating on the $TCP_{FL}^{URHW}$ actuator, the hydrophobic coating comprising a mixture of a polymer matrix and carbon nanotubes, nickel nanoparticles, and mesoporous carbon nanoparticles disposed in the polymer matrix with a composition of between about 5.0 wt. % about 15.0 wt. % carbon nanotubes, between about 5.0 wt. % and about 15.0 wt. % metal nanoparticles, between about 30.0 wt. % and about 50.0 wt. % mesoporous carbon nanoparticles, and between about 30.0 wt. % and about 50 wt. % polymer.

20. The actuator according to claim 19, wherein the polymer matrix is polyvinyl alcohol.

\* \* \* \* \*